US012812024B2

(12) United States Patent
Li et al.

(10) Patent No.: US 12,812,024 B2
(45) Date of Patent: Nov. 24, 2026

(54) RECEIVER WITH MULTIPLE TRANSMISSION MODE SETTINGS

(71) Applicant: SigmaStar Technology Ltd., Xiamen (CN)

(72) Inventors: Jian Li, Shanghai (CN); Kai Sun, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 258 days.

(21) Appl. No.: 18/792,754

(22) Filed: Aug. 2, 2024

(65) Prior Publication Data

US 2025/0063109 A1 Feb. 20, 2025

(30) Foreign Application Priority Data

Aug. 17, 2023 (CN) ......................... 202311034284.1

(51) Int. Cl.
*H04L 69/18* (2022.01)

(52) U.S. Cl.
CPC .................................... *H04L 69/18* (2013.01)

(58) Field of Classification Search
None
See application file for complete search history.

(56) References Cited

U.S. PATENT DOCUMENTS

2014/0029702 A1* 1/2014 Wu ..................... H04L 25/0292 375/340
2024/0303214 A1* 9/2024 Jin ........................... H03K 5/24

* cited by examiner

*Primary Examiner* — Kenneth B Wells
(74) *Attorney, Agent, or Firm* — Edell, Shapiro & Finnan, LLC

(57) ABSTRACT

A receiver includes a termination resistor circuit, a reference voltage generator, a comparator, a filter and a digital circuit. The termination resistor circuit outputs a common-mode voltage in a calibration mode and outputs multiple input signals in multiple transmission modes. The reference voltage generator outputs the common-mode voltage in the calibration mode, and provides multiple reference voltages in the transmission modes. The comparator generates a first signal according to the common-mode voltage and performs an offset calibration in response to an offset calibration signal in the calibration mode, and compares the reference voltages with the input signals to generate the first signal in the transmission modes. The filter outputs the first signal as an output signal in the calibration mode, and generates the output signals according to the first signal in the transmission modes. The digital circuit generates the offset calibration signal according to the output signal.

13 Claims, 11 Drawing Sheets

RECEIVER WITH MULTIPLE TRANSMISSION MODE SETTINGS

This application claims the benefit of China application Serial No. CN202311034284.1, filed on Aug. 17, 2023, the subject matter of which is incorporated herein by reference.

BACKGROUND OF THE INVENTION

Field of the Invention

The present application relates to a receiver, and more particularly to a receiver with an application of multiple transmission modes and which is capable of detecting handshake signals.

Description of the Related Art

A receiver needs to first determine whether a received signal is a handshake signal complying with specifications of a transmission protocol before a connection with another device can be established. In the prior art, handshake signals specified by different transmission protocols have different signal characteristics, such that a receiver may need to be provided with multiple sets of circuits for identification. Thus, in an application of multiple transmission modes, the number of circuits in the receiver is significantly increases, resulting in overly large increases in the circuit area and costs.

SUMMARY OF THE INVENTION

In some embodiments, it is an object of the present application to provide a cost-down receiver with an application of multiple transmission modes so as to overcome the issues of the prior art.

In some embodiments, a receiver includes a termination resistor circuit, a reference voltage generator, a comparator, a filter and a digital circuit. The termination resistor circuit outputs a common-mode voltage in a calibration mode and outputs a plurality of input signals in a plurality of transmission modes. The reference voltage generator outputs the common-mode voltage in the calibration mode, and provides a plurality of reference voltages in the transmission modes. The comparator generates a first signal according to the common-mode voltage and performs an offset calibration in response to an offset calibration signal in the calibration mode, and compares the reference voltages with the input signals to generate the first signal in the transmission modes. The filter outputs the first signal as an output signal in the calibration mode, and generates the output signal according to the first signal in the transmission modes. The digital circuit generates the offset calibration signal according to the output signal.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
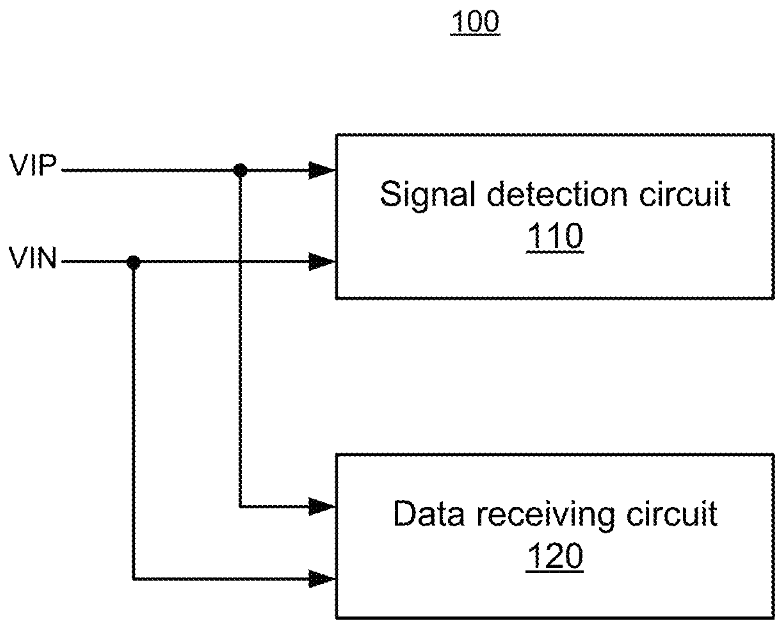
FIG. 1 is a schematic diagram of a receiver according to some embodiments of the present application.

FIG. 1 shows a schematic diagram of a receiver 100 according to some embodiments of the present application. In some embodiments, the receiver 100 is applicable to various wired transmissions, for example but not limited to, Universal Serial Bus (USB), Serial Advanced Technology Attachment (SATA), and Peripheral Component Interconnect Express (PCI-E).

The receiver 100 includes a signal detection circuit 110 and a data receiving circuit 120. The signal detection circuit 110 may detect whether an input signal VIP and an input signal VIN received belong to handshake signals under a predetermined transmission protocol to accordingly establish a connection according to the handshake signals. Once it is determined that the connection is established, the data receiving circuit 120 may be activated so as to perform data processing according to the subsequent input signal VIP and input signal VIN. In some embodiments, the signal detection circuit 110 is applicable to multiple transmission modes by using one single comparator to thereby reduce circuit costs.

Figure 2:
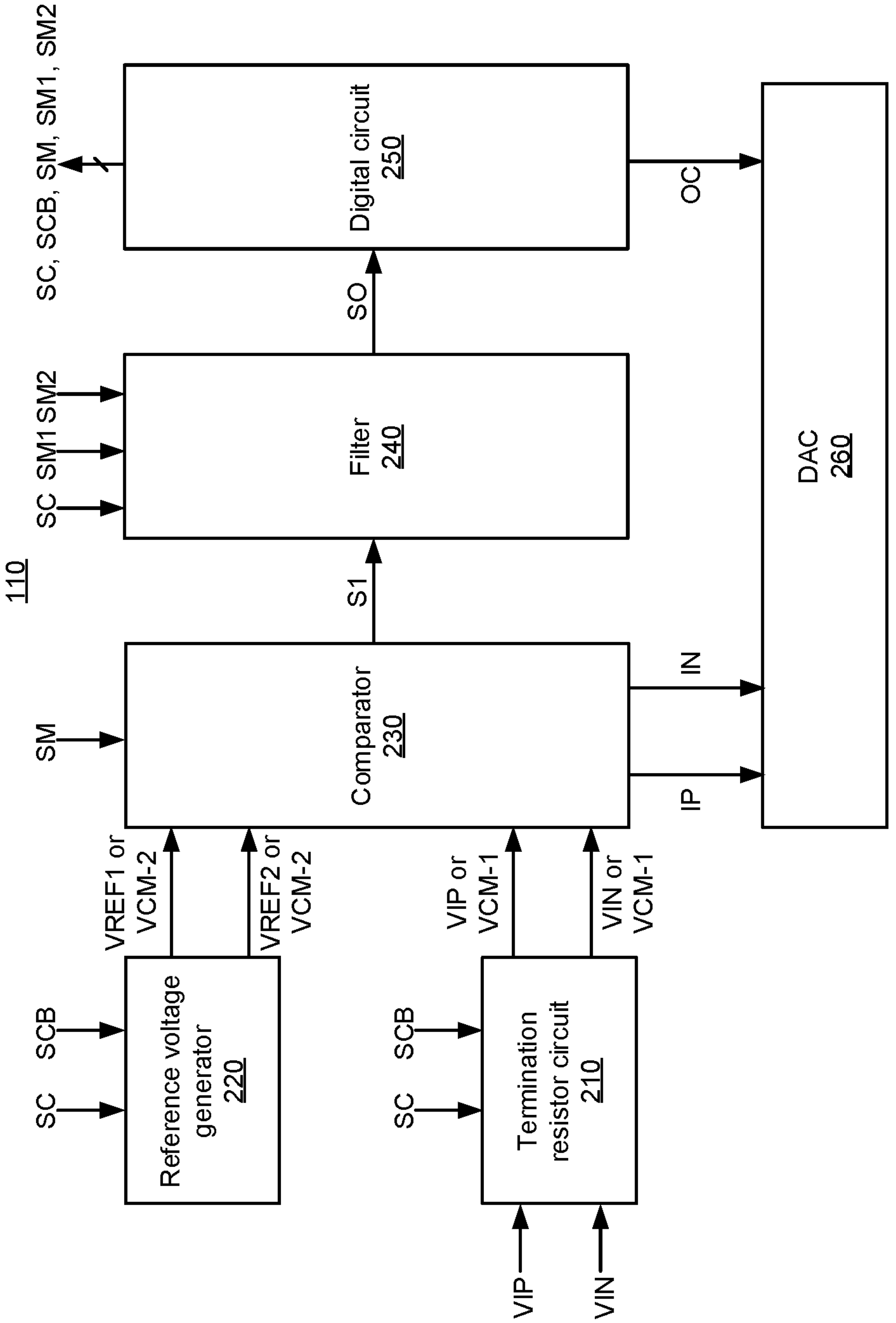
FIG. 2 is a schematic diagram of a signal detection circuit in FIG. 1 according to some embodiments of the present application.

FIG. 2 shows a schematic diagram of the signal detection circuit 110 in FIG. 1 according to some embodiments of the present application. The signal detection circuit 110 includes a termination resistor circuit 210, a reference voltage generator 220, a comparator 230, a filter 240, a digital circuit 250 and a digital-to-analog converter (DAC) 260.

The termination resistor circuit 210 is configured to provide impedance matching so as to receive the input signal VIP and the input signal VIN. More specifically, the termination resistor circuit 210 may operate in the calibration mode or in one of the multiple transmission modes. The termination resistor circuit 210 may output a common-mode voltage VCM-1 in the calibration mode and output the input signal VIP and the input signal VIN in the multiple transmission modes. Configuration details of the termination resistor circuit 210 are to be described with reference to FIG. 3; however, the present application is not limited thereto.

The reference voltage generator 220 generates the common-mode voltage VCM-2 and multiple reference voltages VREF1 and VREF2 according to a supply voltage VDD. More specifically, the reference voltage generator 220 may operate in one of the multiple transmission modes or in the calibration mode in response to multiple calibration control signals SCB and SC. The reference voltage generator 220 may output the common-mode voltage VCM-1 in the calibration mode, and provide the multiple reference voltages VREF1 and VREF2 in the multiple transmission modes. Configuration details of the reference voltage generator 220 are described with reference to FIG. 4; however, the present application is not limited thereto.

Figure 5:
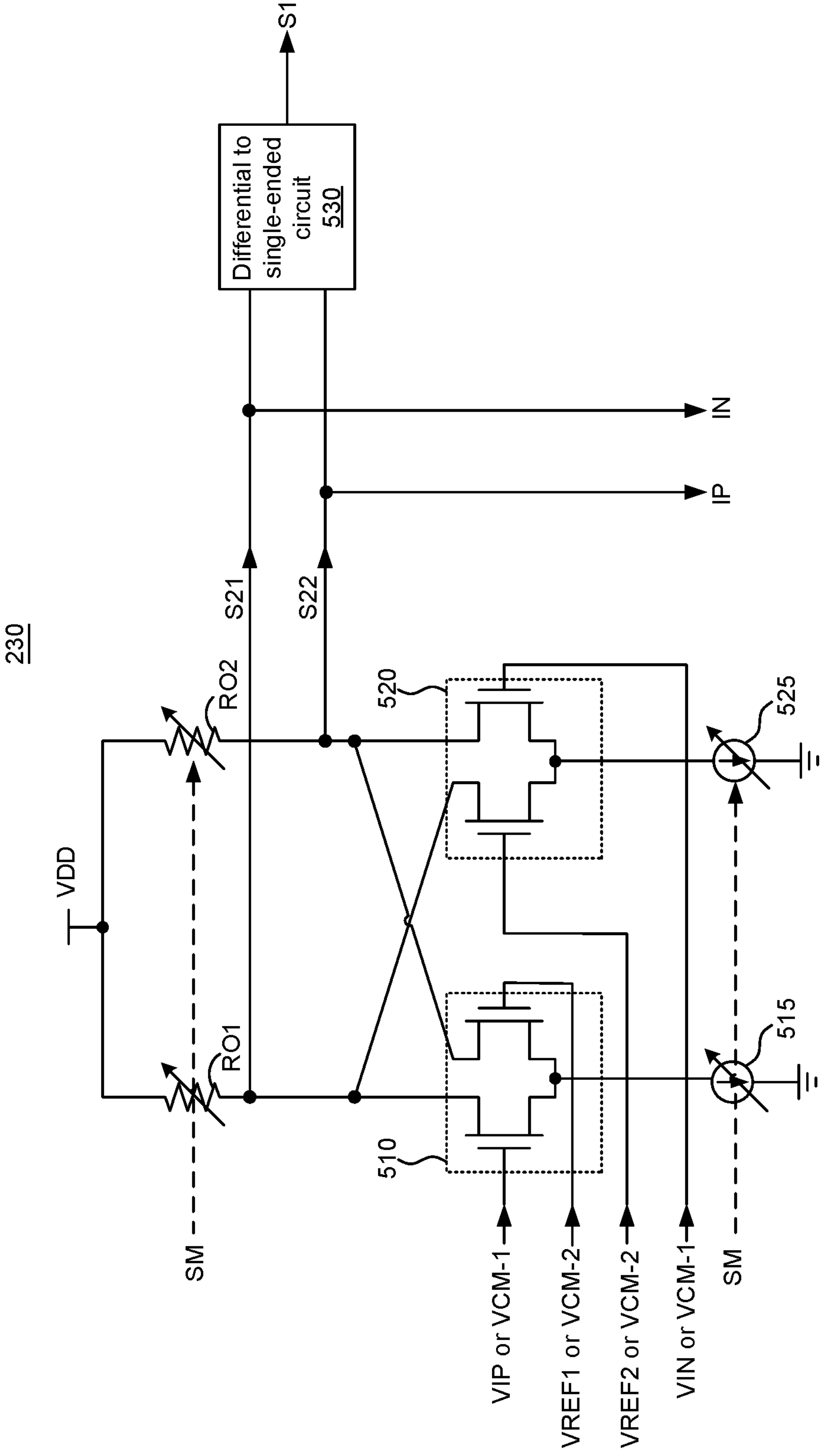
FIG. 5 is a schematic diagram of a comparator in FIG. 2 according to some embodiments of the present application.

As shown in FIG. 5, the comparator 230 may generate a signal S1 according to the common-mode voltages VCM-1 and VCM-2 to accordingly perform an offset calibration in response to an offset calibration signal OC in the calibration mode, and compare the multiple reference voltages VREF1 and VREF2 with the multiple input signals VIP and VIN to generate the signal S1 in the multiple transmission modes. In some embodiments, the comparator 230 may have different circuit configurations in different transmission modes in response to the control signal SM. Configuration details of the comparator 230 are to be described with reference to FIG. 5; however, the present application is not limited thereto.

The filter 240 may selectively operate in one of the multiple transmission modes or in the calibration mode in response to multiple mode control signals SM1 and SM2 and the calibration signal SC, and output a corresponding output signal SO. For example, the filter 240 may operate in the calibration mode in response to the calibration control signal SC, and output an output signal S1 in the calibration mode as the output signal SO. The filter 240 may operate in a first transmission mode of the multiple transmission modes in response to the control signal SM1, and perform low-pass filtering on the signal S1 to generate the output signal SO in the first transmission mode.

Alternatively, the filter 240 may operate in a second transmission mode of the multiple transmission modes in response to the mode control signal SM2, and generate the output signal SO according to the signal S1 in the second transmission mode, wherein the output signal SO is an envelope signal of the signal S1. Configuration details of the filter 240 are to be described with reference to FIG. 6, FIG. 7A, FIG. 7B, FIG. 8A and FIG. 8B; however, the present application is not limited thereto.

In some embodiments, the digital circuit 250 may be implemented by multiple digital logic circuits so as to execute a predetermined operation process according to the output signal SO. For example, when the receiver 100 operates in the calibration mode, the digital circuit 250 may perform a calibration algorithm (for example, but not limited to, a successive approximation register (SAR) algorithm) to accordingly output an offset calibration signal OC, so as to calibrate an offset caused by non-ideal factors such as manufacturing variations. Alternatively, when the receiver 100 operates in one of the multiple transmission modes, the digital circuit 250 may detect according to the output signal SO whether the currently received input signal VIP and input signal VIN are handshake signals defined by a protocol corresponding to a corresponding transmission mode, so as to determine whether to establish a connection to a device (not shown) issuing the input signal VIP and the input signal VIN. In some embodiments, the digital circuit 250 may further generate the multiple calibration signals SC and SCB and the mode control signals SM, SM1 and SM2 described above.

The DAC 260 may source a current signal IP and a current IN from the comparator 230 according to the offset calibration signal OC so as to calibrate the comparator 230. For example, the DAC 260 may source the current signal IP and the current signal IN according to the offset calibration signal OC in the calibration mode, so that a level at an internal node of the comparator 230 can be calibrated to a target level to eliminate the offset of the comparator 230. Configuration details of the DAC 260 are to be described with reference to FIG. 9; however, the present application is not limited thereto.

Figure 3:
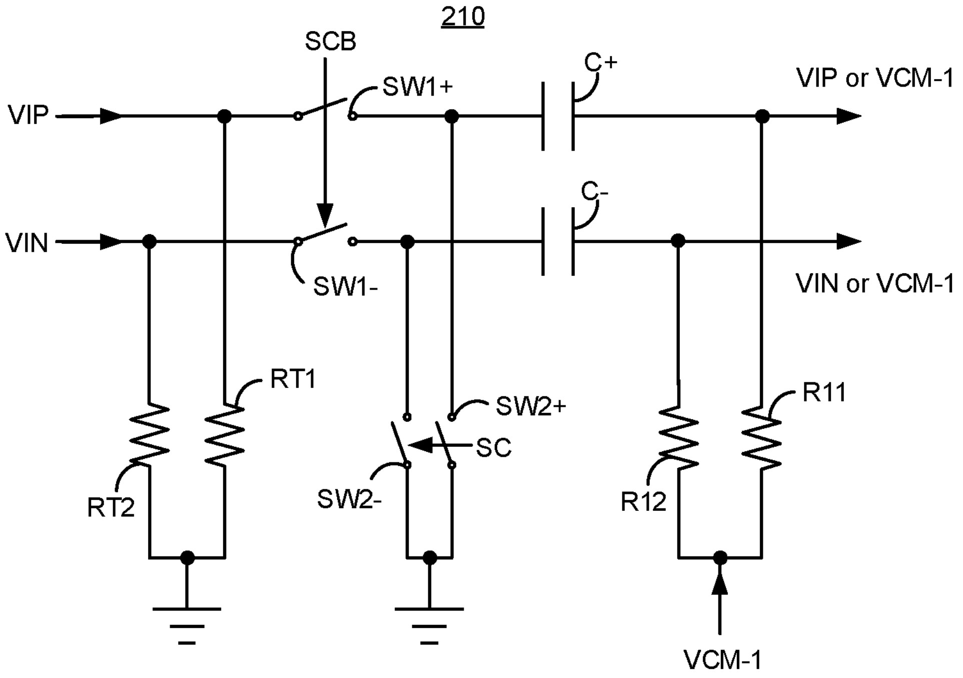
FIG. 3 is a schematic diagram of a termination resistor circuit in FIG. 2 according to some embodiments of the present application.

FIG. 3 shows a schematic diagram of the termination resistor circuit 210 in FIG. 2 according to some embodiments of the present application. In some embodiments, the termination resistor circuit 210 may include multiple termination resistors RT1 and RT2, multiple switches SW1+ and SW1−, multiple switches SW2+ and SW2−, multiple capacitors C+ and C−, and multiple resistors R11 and R12. The multiple termination resistors RT1 and RT2 are coupled to ground, and receive the input signal VIP and input signal VIN. More specifically, first ends of the multiple termination resistors RT1 and RT2 respectively receive the input signal VIP and the input signal VIN, and are respectively coupled to first terminals of the multiple switches SW1+ and SW1−. Second ends of the multiple termination resistors RT1 and RT2 are coupled to ground.

The multiple switches SW1+ and SW1− are coupled to the multiple termination resistors RT1 and RT2, and are turned on in the multiple transmission modes and turned off in the calibration mode. More specifically, second terminals of the multiple switches SW1+ and SW1− are respectively coupled to the multiple switches SW2+ and SW2− and the multiple capacitors C+ and C−. Control terminals of the multiple switches SW1+ and SW1− receive the calibration control signal SCB. In other words, the multiple switches SW1+ and SW1− may be selectively turned on according to the calibration control signal SCB.

In some embodiments, when the receiver 100 operates in the calibration mode, the calibration control signal SC is at an enabled level (for example, but not limited to, a level corresponding to logic 1), and the calibration control signal SCB is at a disabled level (for example, but not limited to, a level corresponding to logic 0). On the other hand, when the receiver 100 operates in one of the multiple transmission modes, the calibration control signal SC is at a disabled level, and the calibration control signal SCB is at an enabled level. In this case, when the receiver 100 operates in the calibration mode, the multiple switches SW1+ and SW1− may be turned off in response to the calibration control signal SCB at a disabled level. Thus, the multiple switches SW1+ and SW1− do not transmit the multiple input signals VIN and VIP to subsequent circuits.

First terminals of the multiple switches SW2+ and SW2− are respectively coupled to the second terminals of the multiple switches SW1+ and SW1−, second terminals of the multiple switches SW2+ and SW2− are coupled to ground, and control terminals of the multiple switches SW2+ and SW2− receive the calibration control signal SC. In other words, the multiple switches SW2+ and SW2− may be selectively turned on according to the calibration control signal SC. In this case, when the receiver 100 operates in the calibration mode, the multiple switches SW2+ and SW2− may be turned on in response to the calibration control signal SC at a disabled level, so as to couple first ends of the multiple capacitors C+ and C− to ground. First ends of the multiple resistors R11 and R12 are coupled to second ends of the multiple capacitors C+ and C−, and second ends of the multiple resistors R11 and R12 receive the common-mode voltage VCM-1.

With the settings above, when the receiver 100 operates in the calibration mode, the multiple switches SW2+ and SW2− are turned on, and the multiple switches SW1+ and SW− are turned off. In this case, the multiple switches SW2+ and SW2− couple the first ends of the multiple capacitors C+ and C− to ground via the multiple switches SW2+ and SW2−, and the second ends of the multiple capacitors C+ and C− receive the common-mode voltage VCM-1 via the multiple resistors R11 and R12, accordingly providing the common-mode voltage VCM-1 to the comparator 230. Alternatively, when the receiver 100 operates in one of the transmission modes, the multiple switches SW1+ and SW1− are turned on, and the multiple switches SW2+ and SW− are turned off. In this case, the multiple capacitors C+ and C− are operable as an alternating-current (AC) coupling circuit, so as to receive AC components in the multiple input signals VIP and VIN via the multiple switches SW1+ and SW1−. The multiple resistors R11 and R12 may add the common-voltage VCM-1 to these AC components, and output an added result (equivalent to the input signals VIP and VIN having been shifted) to the comparator 230.

Figure 4:
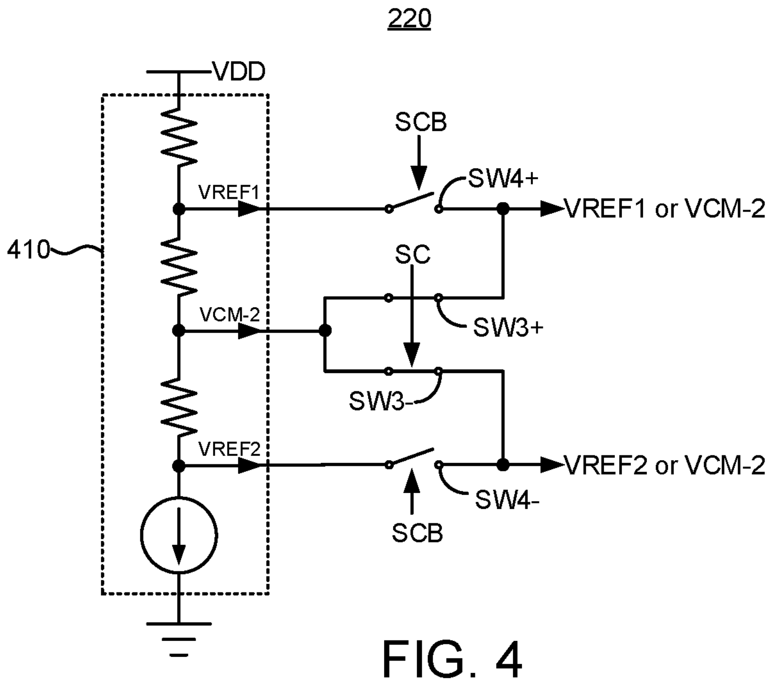
FIG. 4 is a schematic diagram of a reference voltage generator in FIG. 2 according to some embodiments of the present application.

FIG. 4 shows a schematic diagram of the reference voltage generator 220 in FIG. 2 according to some embodiments of the present application. The reference voltage generator 220 includes a voltage dividing circuit 410, multiple switches SW3+ and SW3−, and multiple switches SW4+ and SW4−. The voltage dividing circuit 410 may include multiple resistors connected in series and a current source, and may divide the supply voltage VDD to generate the reference voltage VREF1, the common-mode voltage VCM and the reference voltage VREF2. First terminals of the multiple switches SW3+ and SW3− are coupled to the voltage dividing circuit 410 to receive the common-mode voltage VCM-2, second terminals of the multiple switches SW3+ and SW3− are coupled to the comparator 230, and control terminals of the multiple switches SW3+ and SW3− receive the calibration control signal SC. In other words, when the receiver 100 operates in the calibration mode, the multiple switches SW3+ and SW3− may be turned on in response to the calibration control signal SC so as to transmit the common-mode voltage VCM-2 to the comparator 230.

Conversely, when the receiver 100 operates in transmission modes, the multiple switches SW3+ and SW3− may be turned off in response to the calibration control signal SC.

First terminals of the multiple switches SW4+ and SW4− are coupled to the voltage dividing circuit 410 to respectively receive the reference voltages VREF1 and VREF2, second terminals of the multiple switches SW4+ and SW4− are coupled to second ends of the multiple switches SW3+ and SW3− and the comparator 230, and control terminals of the multiple switches SW4+ and SW4− receive the calibration control signal SCB. When the receiver 100 operates in the calibration mode, the multiple switches SW4+ and SW4− may be turned off in response to the calibration control signal SCB. Conversely, when the receiver 100 operates in the transmission modes, the multiple switches SW4+ and SW4− may be turned on in response to the calibration control signal SCB so as to transmit the multiple reference voltages VREF1 and VREF2 to the comparator 230.

FIG. 5 shows a schematic diagram of the comparator 230 in FIG. 2 according to some embodiments of the present application. The comparator 230 includes multiple resistors RO1 and RO1, multiple input pair circuits 510 and 520, multiple current sources 515 and 525, and a differential to single-ended circuit 530. The multiple input pair circuits 510 and 520 operate as a cross-couped input pair, are coupled to the multiple resistors RO1 and R02 and accordingly generate multiple signals S21 and S22. The multiple current sources 515 and 525 respectively drive the multiple input pair circuits 510 and 520. In the calibration mode, inputs of the multiple input pair circuits 510 and 520 are both the common-mode voltages VCM-1 and VCM-2, such that the multiple input pair circuits 510 and 520 are able to generate the multiple signals S21 and S22 according to the common-mode voltages VCM-1 and VCM-2. In this case, the multiple signals S21 and S22 are ideally at the same level. In a practical application, the comparator 230 may be affected by an offset, such that the levels of the multiple signals S21 and S22 may not be the same as each other. Thus, in the calibration mode, the DAC 260 may source the current signal IN and the current signal IP from multiple nodes that generate the signals S21 and S22, so as to correct the levels at these nodes to thereby reduce the influences of the offset.

On the other hand, in one of the transmission modes, the inputs of the multiple input pair circuits 510 and 520 are switched to the multiple input signals VIP and VIN and the multiple reference voltages VREF1 and VREF2, such that the multiple input pair circuits 510 and 520 are able to generate the multiple signals S21 and S22 according to the multiple input signals VIP and VIN and the multiple reference voltages VREF1 and VREF2. For example, the input pair circuit 510 may compare the input signal VIP with the reference voltage VREF1, and the input pair circuit 520 may compare the input signal VIN with the reference voltage VREF2, thereby generating the corresponding signals S21 and S22. The differential to single-ended circuit 530 may generate the signal S1 according to the signal S21 and the signal S22.

In some embodiments, the comparator 230 may have different circuit configurations in different transmission modes. As described above, the resistance values of the multiple resistors RO1 and R02 may be adjusted according to the mode control signal SM to thereby provide different resistance values. For example, according to the mode control signal SM, the resistance values of the multiple resistors RO1 and R02 in the first transmission mode may be different from the resistance values in the second transmission mode. Alternatively, the current values of the current sources 515 and 525 may be adjusted according to the mode control signal SM to thereby provide different current values. For example, according to the mode control signal SM, the current values of the multiple current sources 515 and 525 in the first transmission mode may be different from the current values in the second transmission mode. In some embodiments, the mode control signal SM may be the mode control signal SM1, the mode control signal SM2, or another signal based on at least one of the two signals above.

Figure 6:
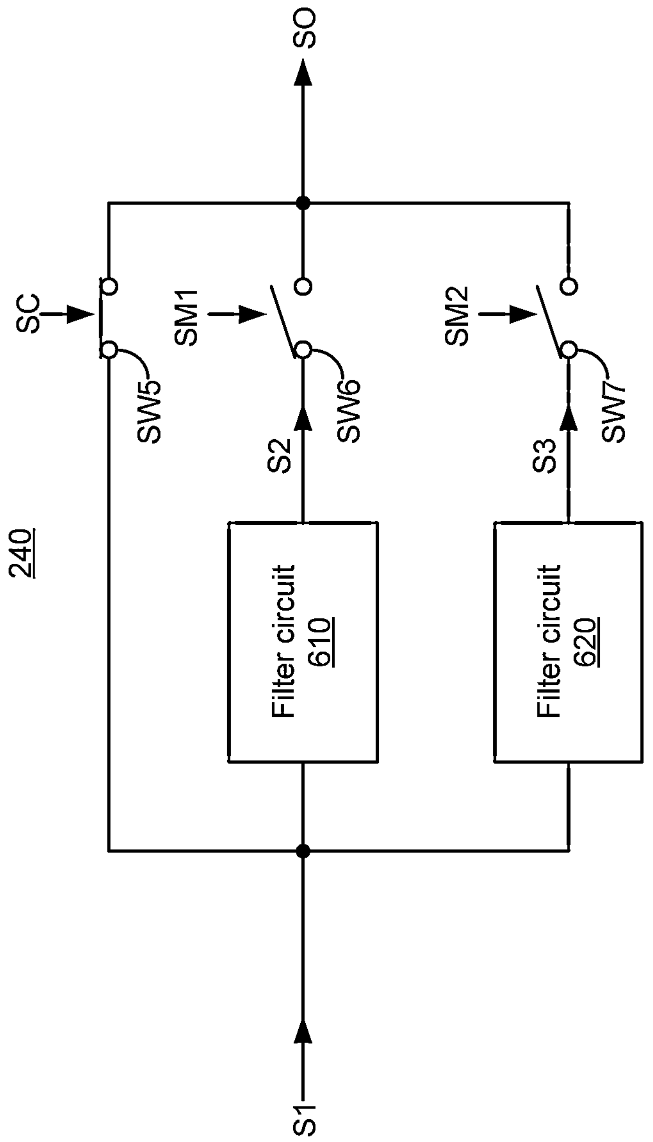
FIG. 6 is a schematic diagram of a filter in FIG. 2 according to some embodiments of the present application.

FIG. 6 shows a schematic diagram of the filter 240 in FIG. 2 according to some embodiments of the present application. The filter 240 includes multiple switches SW5 to SW7, a filter circuit 610 and a filter circuit 620. The switch SW5 is turned off in the multiple transmission modes, and is turned on in the calibration mode so as to output the signal S1 as the output signal SO. For example, the switch SW5 may be turned on according to the calibration control signal SC so as to output the signal S1 as the output signal SO. In other words, when the receiver 100 operates in the calibration mode, the filter 240 does not process the signal S1 but directly outputs the signal S1 as the output signal SO.

The filter circuit 610 generates the signal S2 according to the signal S1. The filter circuit 610 generates the signal S3 according to the signal S1. The switch SW6 is coupled to the filter circuit 610 so as to receive the signal S2. The switch SW6 is turned off in the calibration mode, and is turned on in the first transmission mode so as to output the signal S2 as the output signal SO. In some embodiments, when the receiver 100 operates in the first transmission mode, the mode control signal SM1 may have a first logical value (for example, but not limited to, logic 1), and the mode control signal SM2 may have a second logical value (for example, but not limited to, logic 0). Conversely, when the receiver 100 is configured to operate in the first transmission mode, the mode control signal SM2 may have a first logical value, and the mode control circuit SM1 may have a second logical value. In this case, the switch SW6 may be turned on according to the mode control signal SM1 so as to output the signal S2 as the output signal SO in the first transmission mode.

The filter circuit 620 generates the signal S3 according to the signal S1. The filter circuit 620 generates the signal S3 according to the signal S1. The switch SW7 is coupled to the filter circuit 620 so as to receive the signal S3. The switch SW7 is turned off in the calibration mode, and is turned on in the second transmission mode so as to output the signal S3 as the output signal SO. For example, the switch SW6 may be turned on according to the mode control signal SM2 so as to output the signal S3 as the output signal SO in the second transmission mode.

Figure 7A:
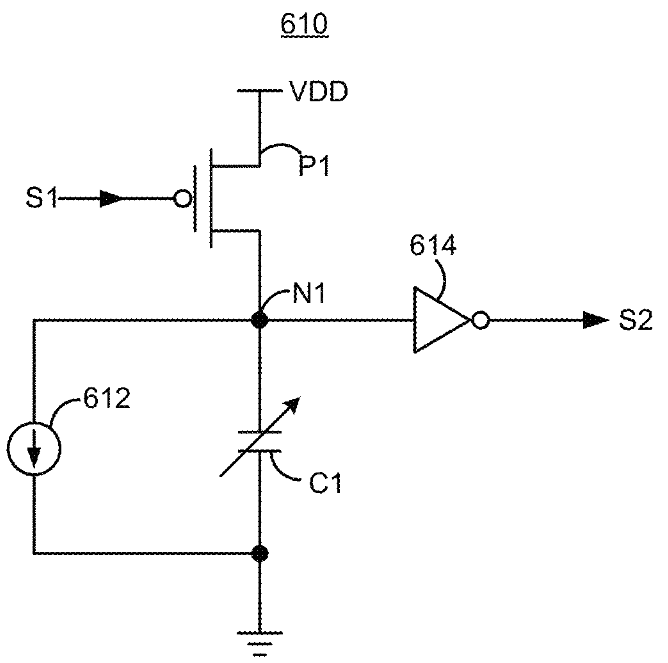
FIG. 7A is a schematic diagram of a filter circuit in FIG. 6 according to some embodiments of the present application.

FIG. 7A shows a schematic diagram of the filter circuit 610 in FIG. 6 according to some embodiments of the present application. In some embodiments, the filter circuit 610 is configured to process handshake signals in the first transmission mode (for example, but not limited to, a USB mode). The filter circuit 610 includes a transistor P1, a current source 612, a capacitor C1 and an inverter 614. A first terminal (for example, the source) of the transistor P1 receives the power supply voltage VDD, a second terminal of the transistor P1 is coupled to the node N1, and a control terminal (for example, the gate) of the transistor P1 receives the signal S1. The transistor P1 may be selectively turned on according to the signal S1, so as to transmit the supply voltage VDD to the node N1 to thereby adjust the level of the node N1. The current source 612 is coupled to the node N1 to source a current from the node N1. The capacitor C1 is coupled between the node N1 and the ground. The inverter 614 generates the signal S2 according to the level of the node N1.

Figure 7B:
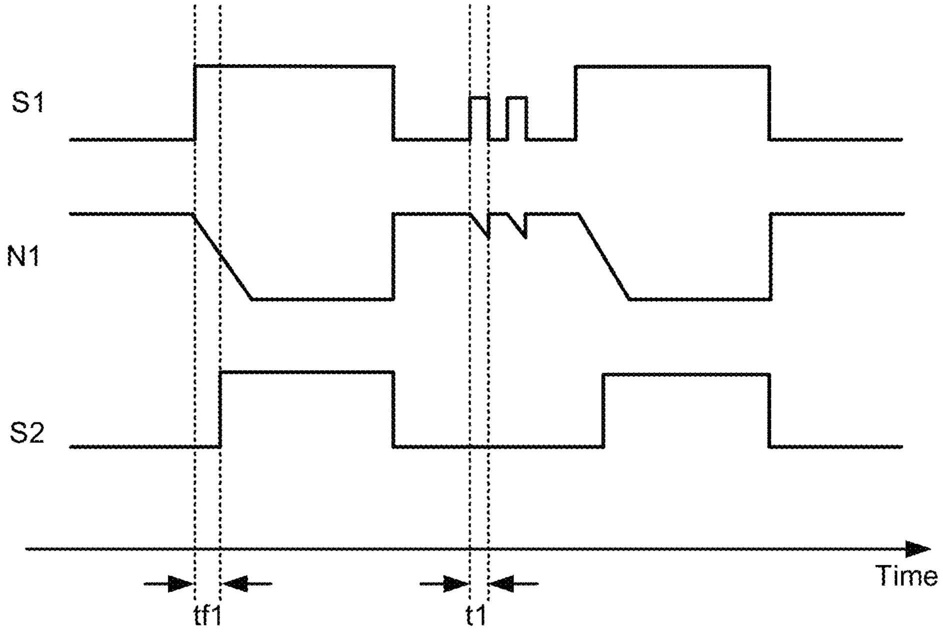
FIG. 7B is a schematic diagram of waveforms of some signals in FIG. 7A according to some embodiments of the present application.

FIG. 7B shows a schematic diagram of waveforms of some signals in FIG. 7A according to some embodiments of the present application. As shown in FIG. 7B, the filter circuit 610 is configured to perform low-pass filtering on the signal S1, so as to remove high-frequency noise from the signal S1. For example, when the signal S1 contains a high-level pulse width (for example, having a period t1) that is too short (for example, less than a period tf1), the corresponding pulse cannot be output as a part of the signal S2. Or, when the signal S1 contains a high-level pulse width that is sufficiently large (for example, greater than or equal to the period tf1), the corresponding pulse is output as a part of the signal S2. As an explanation from another perspective, when the pulse in the signal S1 has a longer high-level period, an off period of the transistor P1 is increased, such that the current source 612 may pull down the level of the node N1 in the period, allowing the inverter 614 to generate a corresponding pulse in the signal S2. On the other hand, when the pulse in the signal S1 has an insufficient high-level period, an on period of the transistor P1 is increased, such that the level of the node N1 is limited by the supply voltage VDD, in a way that the inverter 614 is unable to generate a corresponding pulse in the signal S2.

In some embodiments, the first transmission mode may be, for example but not limited to, the USB mode. On the basis of the USB 3.0 specifications, a handshake signal used during a handshake between a transmitting end and a receiving end is a low-frequency signal. Thus, circuit behaviors of the filter circuit 610 above may be used to detect such a handshake signal, instead of outputting high-speed data signals as the signal S2.

Figure 8A:
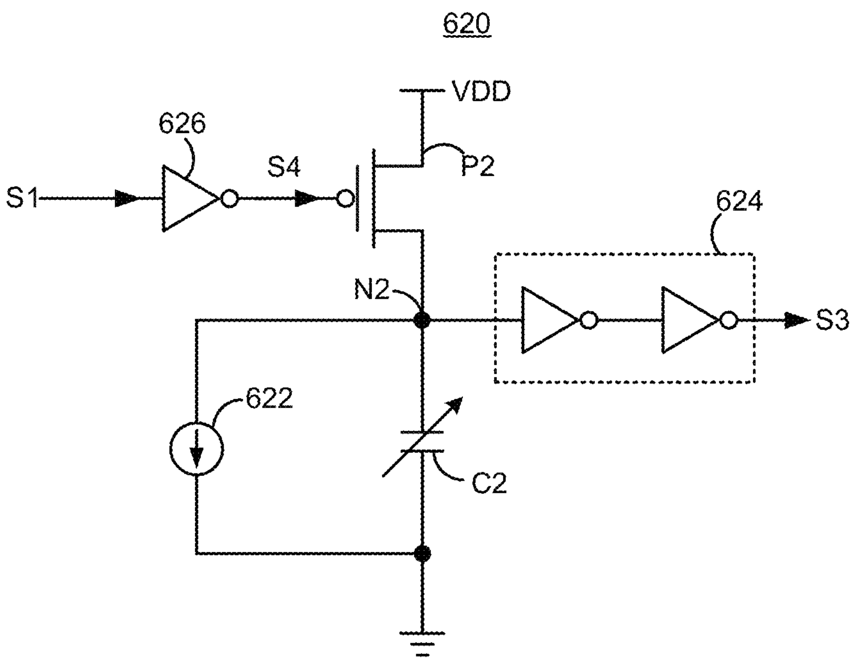
FIG. 8A is a schematic diagram of a filter circuit in FIG. 6 according to some embodiments of the present application.

FIG. 8A shows a schematic diagram of the filter circuit 620 in FIG. 6 according to some embodiments of the present application. In some embodiments, the filter circuit 620 is configured to process handshake signals in the second transmission mode (for example, but not limited to, a SATA mode). The filter circuit 620 includes an inverter 626, a transistor P2, a current source 622, a capacitor C2 and a buffer 624. The filter circuit 626 generates a signal S4 according to the signal S1. A first terminal (for example, the source) of the transistor P2 receives the power supply voltage VDD, a second terminal of the transistor P2 is coupled to the node N2, and a control terminal (for example, the gate) of the transistor P2 receives the signal S4. The transistor P2 may be selectively turned on according to the signal S4, so as to transmit the supply voltage VDD to the node N2 to thereby adjust the level of the node N2. The current source 622 is coupled to the node N2 to source a current from the node N2. The capacitor C2 is coupled between the node N2 and the ground. The buffer 614 generates the signal S3 according to the level of the node N2. In some embodiments, the buffer 624 may be implemented by, for example but not limited to, an odd number of inverters connected in series.

Figure 8B:
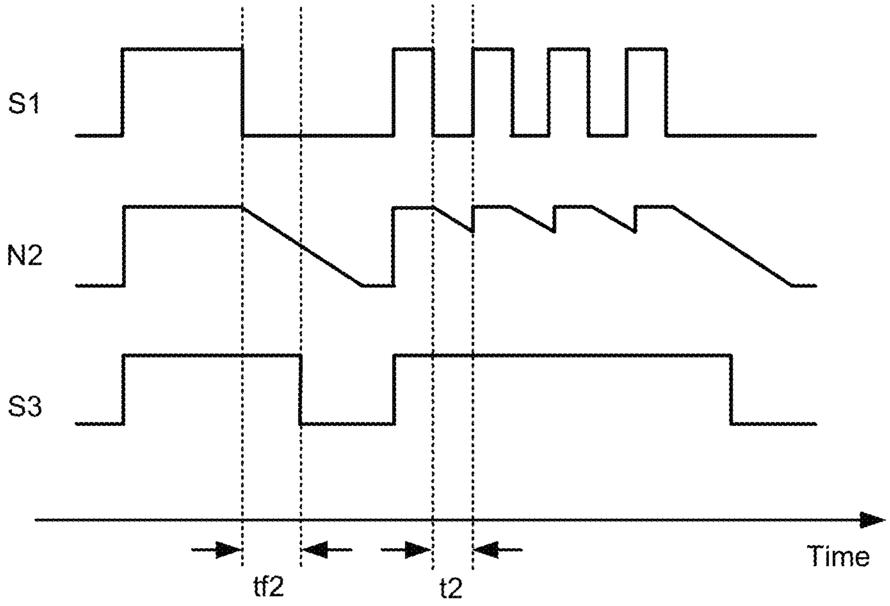
FIG. 8B is a schematic diagram of waveforms of some signals in FIG. 8A according to some embodiments of the present application.

FIG. 8B shows a schematic diagram of waveforms of some signals in FIG. 8A according to some embodiments of the present application. As shown in FIG. 8B, the filter circuit 620 is configured to perform envelope detection on the signal S1 to generate the signal S3 according to the signal S1, wherein the signal S3 is an envelope signal of signal S1. For example, when the signal S1 contains a low-level pulse width (for example, having a period t2) that is too small (for example, less than a period tf2), the envelope of the corresponding pulse cannot be output as a part of the signal S3. Or, when the signal S1 contains a low-level pulse width that is sufficiently large (for example, greater than or equal to the period tf2), the pulse width of the corresponding pulse in the signal S3 is increased by the period tf2.

As an explanation from another perspective, when the pulse in the signal S1 has shorter low-level period, the transistor P2 is constantly turned on such that the node N2 is charged by the supply voltage VDD, allowing the buffer 624 to generate a corresponding envelope signal component in the signal S3. On the other hand, when the pulse in the signal S1 has a sufficient low-level period, the off period of the transistor P2 is increased, such that the level of the node N2 is pulled down by the current source 622, in a way that the pulse width of the corresponding pulse in the signal S3 is increased by the buffer 624.

In some embodiments, the second transmission mode may be, for example but not limited to, the SATA mode. Based on the SATA specifications, a handshake signal used during a handshake is a series of pulse signals. Thus, circuit behaviors of the filter circuit 620 above may be used to detect such handshake signals, and the multiple pulse signals in the handshake signal are reshaped to envelope signals for the digital circuit 250 to perform corresponding signal processing.

Figure 9:
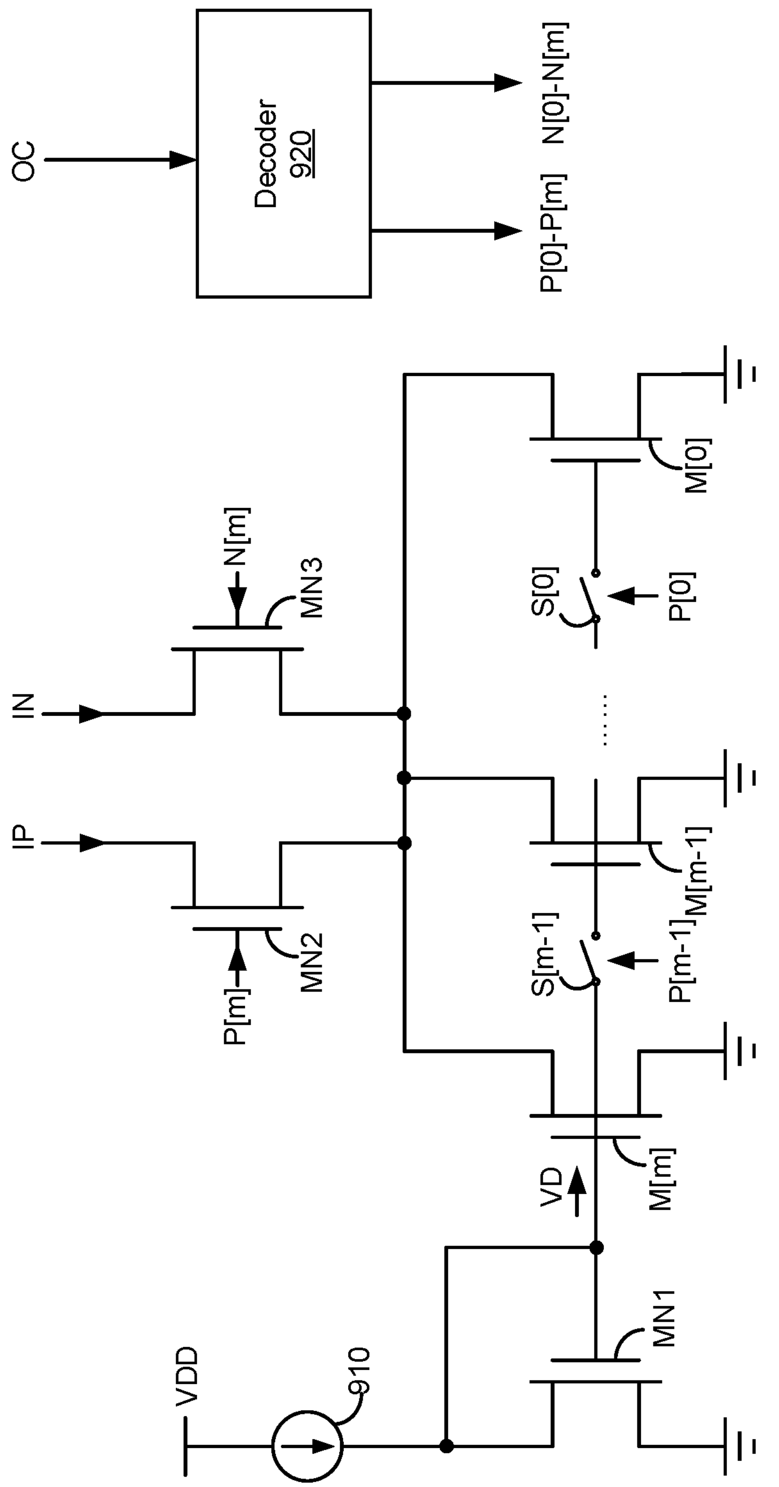
FIG. 9 is a schematic diagram of a digital-to-analog converter (DAC) in FIG. 2 according to some embodiments of the present application.

FIG. 9 shows a schematic diagram of the DAC 260 in FIG. 2 according to some embodiments of the present application. In some embodiments, the DAC 260 may be a current DAC. The DAC 260 includes multiple transistors MN1 to MN3, multiple transistors M[0] to M[m], multiple switches S[0] to S[m−1], a current source 910 and a decoder 920. The decoder 920 may generate multiple control signals P[0] to P[m] and multiple control signals N[0] to N[m] according to m+1 bits in the offset calibration signal OC, wherein the value m may be a positive integer greater than 1. In some embodiments, one of the multiple control signals P[0] to P[m] and one of the multiple control signals N[0] to N[m] have opposite logical values. For example, if the control signal P[m] has logic 1, the control signal N[m] has logic 0. Similarly, the correspondence between the remaining control signals can be understood accordingly.

The transistor MN1 is configured to be a diode-connected transistor, and is driven by the current source 910 to generate a driving voltage VD. The multiple transistors M[0] to M[m] operate as multiple unit current sources. The transistor M[m] is driven by the driving voltage VD so as to source a current from the transistor MN2 or the transistor MN3. The multiple switches S[0] to S[m−1] are respectively controlled by the multiple control signals P[0] to P[m−1], so as to selectively transmit the driving voltage VD to the multiple transistors M[0] to M[m−1]. For example, when the switch S[m−1] is turned on according to the control signal P[m−1], the transistor M[m−1] is able to receive the driving voltage VD and is turned on accordingly to source a current from the transistor MN2 and/or the transistor MN3. When the switch S[m−1] and the switch S[m-2] are turned on according to the control signal P[m−1] and the control signal P[m-2], the transistor M[m−1] and the transistor M[m-2] are able to receive the driving voltage VD and are turned on accordingly to source a current from the transistor MN2 or the transistor MN3. Similarly, when the multiple switch S[0] to S[m−1] are all turned on according to the control signals P[0] to P[m−1], the transistors M[0] to M[m−1] are able to receive the driving voltage VD and are turned on accordingly to source a current from the transistor MN2 or the transistor MN3.

A first terminal (for example, the source) of the transistor MN2 is coupled to a node outputting the signal S22 in the comparator 230 so as to source a current signal IP, a second terminal (for the example, the drain) of the transistor MN2 is coupled to the multiple transistors M[0] to M[m], and a control terminal (for example, the gate) of the transistor MN2 receives the control signal P[m]. Similarly, a first terminal of the transistor MN3 is coupled to a node outputting the signal S21 in the comparator 230 so as to source a current signal IN, a second terminal of the transistor MN2 is coupled to the multiple transistors M[0] to M[m], and a control terminal of the transistor MN3 receives the control signal N[m]. The transistor MN2 and the transistor MN3 may be selectively turned on according to the control signal P[m] and the control signal N[m], respectively, so as to source the current signal IP and/or the current signal IN from the comparator 230.

Figure 10:
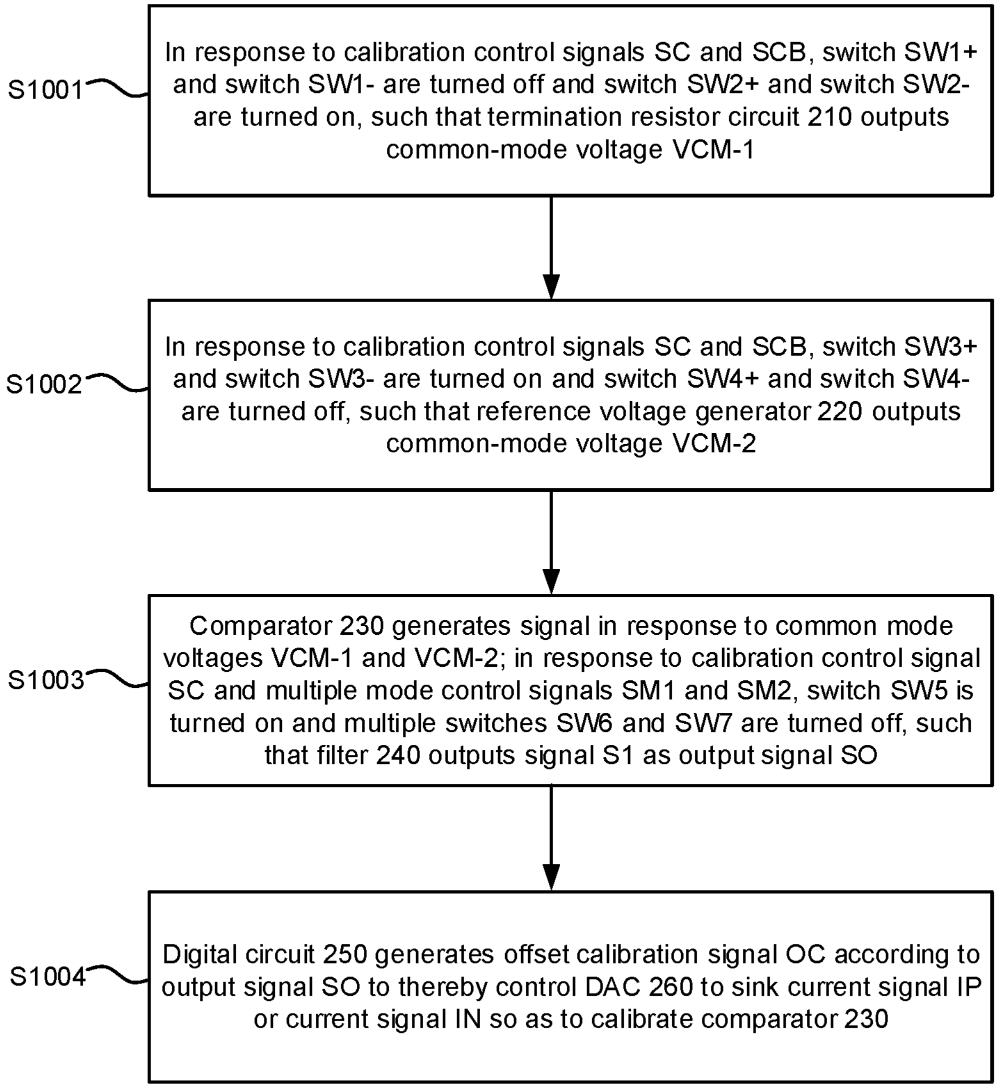
FIG. 10 is a flowchart of an operation of a signal detection circuit in FIG. 2 in a calibration mode according to some embodiments of the present application.

FIG. 10 shows a flowchart of an operation of the signal detection circuit 110 in FIG. 2 in the calibration mode according to some embodiments of the present application. To better understand operations herein, details are to be given with reference to the schematic diagrams corresponding to the embodiments above.

In operation S1001, in response to the calibration control signals SC and SCB, the switches SW1+ and SW1− are turned off and the switches SW2+ and SW2− are turned on, such that the termination resistor circuit 210 outputs the common-mode voltage VCM-1. In operation S1002, in response to the calibration control signals SC and SCB, the switches SW3+ and SW3− are turned on and the switches SW4+ and SW4− are turned off, such that the reference voltage generator 220 outputs the common-mode voltage VCM-2.

In operation S1003, the comparator 230 generates the signal S1 in response to the common-mode voltages VCM-1 and VCM-2. Moreover, in operation S1003, in response to the calibration control signal SC and the multiple mode control signals SM1 and SM2, the switch SW5 is turned on and the multiple switches SW6 and SW7 are turned off, such that the filter 240 outputs the signal S1 as the output signal SO. In operation S1004, the digital circuit 250 generates the offset calibration signal OC according to the output signal SO, and accordingly controls the DAC 260 to source the current signal IP or the current IN to calibrate the comparator 230.

Figure 11A:
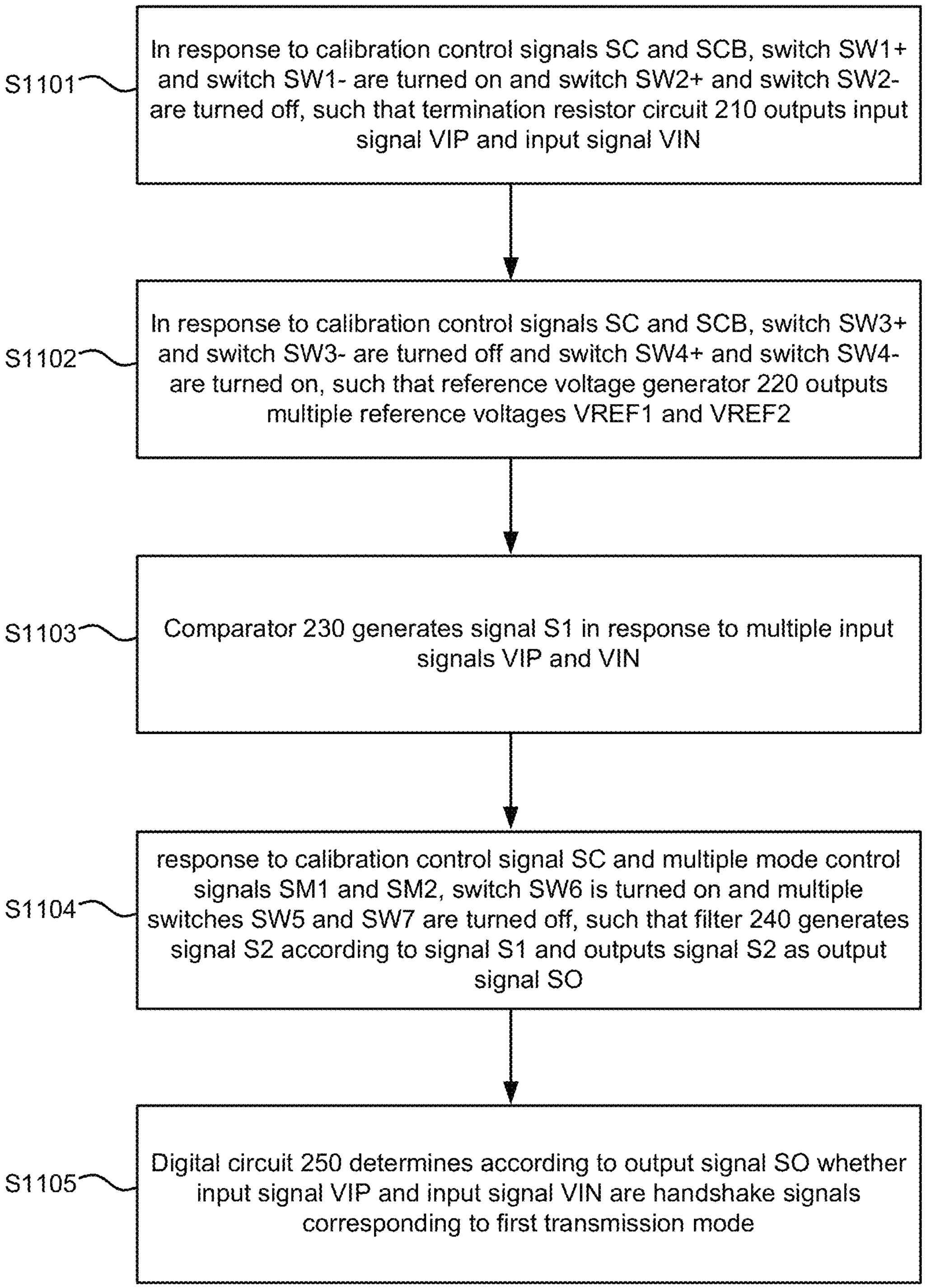
FIG. 11A is a flowchart of an operation of a signal detection circuit in FIG. 2 in a first transmission mode according to some embodiments of the present application.

FIG. 11A shows a flowchart of an operation of the signal detection circuit 110 in FIG. 2 in the first transmission mode according to some embodiments of the present application. To better understand operations herein, details are to be given with reference to the schematic diagrams corresponding to the embodiments above.

In operation S1101, in response to the calibration control signals SC and SCB, the switches SW1+ and SW1− are turned on and the switches SW2+ and SW2− are turned off, such that the termination resistor circuit 210 outputs the input signal VIP and the input signal VIN. In operation S1102, in response to the calibration control signals SC and SCB, the switches SW3+ and SW3− are turned off and the switches SW4+ and SW4− are turned on, such that the reference voltage generator 220 outputs the multiple reference voltages VREF1 and VREF2.

In operation S1103, the comparator 230 generates the signal S1 in response to the multiple input signals VIP and VIN. In operation S1104, in response to the calibration control signal SC and the multiple mode control signals SM1 and SM2, the switch SW6 is turned on and the multiple switches SW5 and SW7 are turned off, such that the filter 240 generates the signal S2 according to the signal S1 and outputs the signal S2 as the output signal SO. In operation S1105, the digital circuit 250 determines according to the output signal SO whether the input signal VIP and the input signal VIN are handshake signals corresponding to the first transmission mode.

Figure 11B:
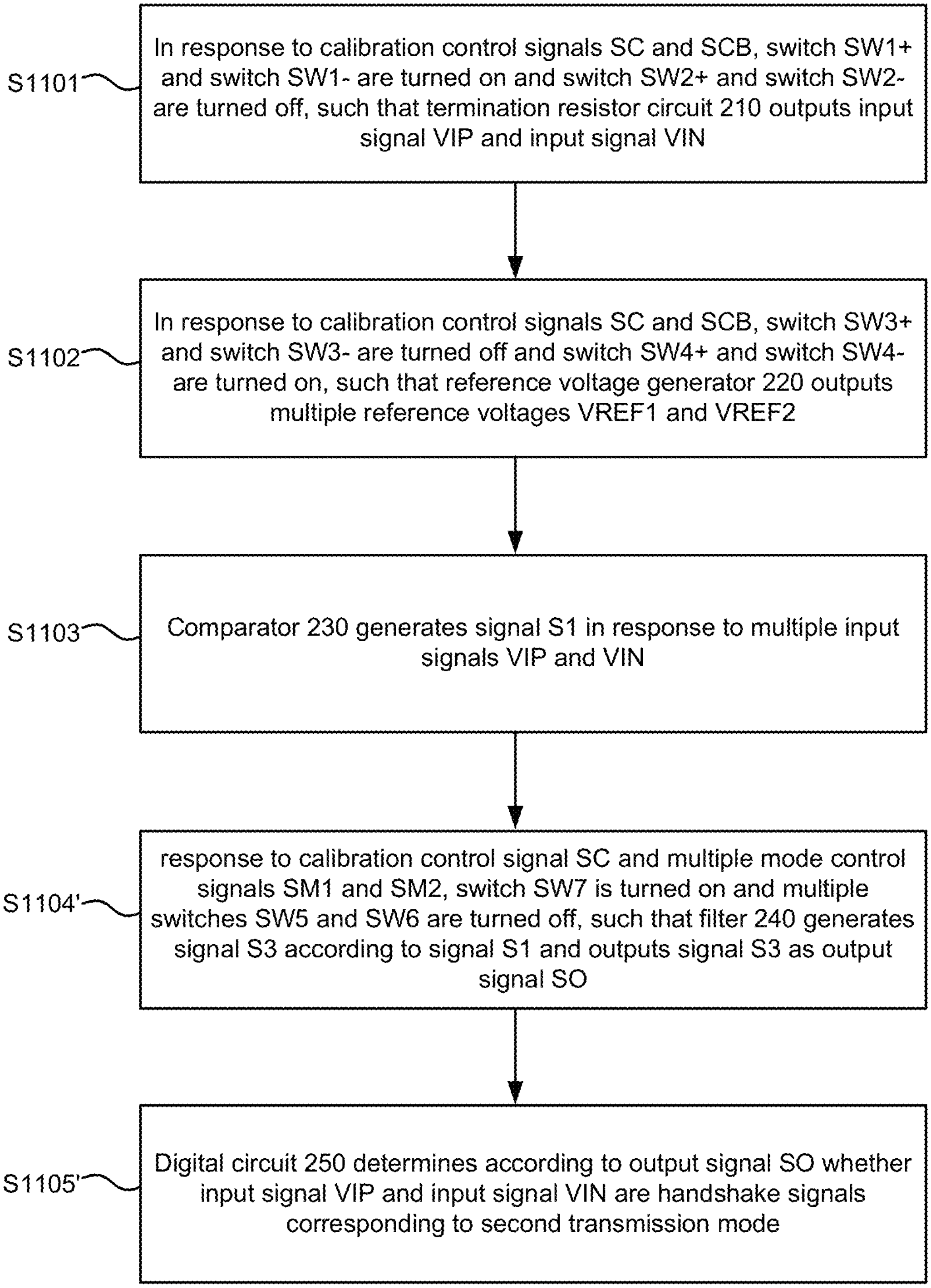
FIG. 11B is a flowchart of an operation of a signal detection circuit in FIG. 2 in a second transmission mode according to some embodiments of the present application.

FIG. 11B shows a flowchart of an operation of the signal detection circuit 110 in FIG. 2 in the second transmission mode according to some embodiments of the present application. To better understand operations herein, details are to be given with reference to the schematic diagrams corresponding to the embodiments above. The multiple operations S1101, S1102 and S1103 in FIG. 11B are the same as those in FIG. 11A, and associated details are omitted herein.

Different from operation S1104 in FIG. 11A, in operation S1104' in FIG. 11B, in response to the calibration control signal SC and the multiple mode control signals SM1 and SM2, the switch SW7 is turned on and the multiple switches SW5 and SW6 are turned off, such that the filter 240 generates the signal S3 according to the signal S1 and outputs the signal S3 as the output signal SO. In operation S1105', the digital circuit 250 determines according to the output signal SO whether the input signal VIP and the input signal VIN are handshake signals corresponding to the second transmission mode.

Details associated with the multiple operations in FIG. 10, FIG. 11A and/or FIG. 11B above can be obtained from the details of the embodiments above, and such repeated details are omitted herein. The multiple operations in FIG. 10, FIG. 11A and/or FIG. 11B are merely examples, and are not limited to being performed in the order specified in the examples. Without departing from the operation means and ranges of the various embodiments of the present application, additions, replacements, substitutions or omissions may be made to the operations in FIG. 10, FIG. 11A and/or FIG. 11B, or the operations may be performed in different orders (for example, entirely simultaneously performed or partially simultaneously performed).

In conclusion, the receiver and the signal detection circuit in some embodiments of the present application are able to implement an application of multiple transmission modes by using a single comparator, and are integrated with an off calibration mechanism for a comparator. Thus, detection accuracy of the comparator can be improved and at the same time circuit costs can be reduced.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded the broadest interpretation so as to encompass all such modifications.

What is claimed is:

1. A receiver, comprising:

a termination resistor circuit, outputting a termination resistor circuit common-mode voltage in a calibration mode and outputting a plurality of input signals in a plurality of transmission modes;

a reference voltage generator, outputting a reference voltage generator common-mode voltage in the calibration mode, and providing a plurality of reference voltages in the transmission modes;

a comparator, generating a first signal according to the termination resistor circuit common-mode voltage and the reference voltage generator common-mode voltage and in the calibration mode, and comparing the reference voltages with the input signals to generate the first signal in the transmission modes;

a filter, outputting the first signal as an output signal in the calibration mode, and generating the output signal according to the first signal in the transmission modes; and a digital circuit, generating an offset calibration signal according to the output signal.

2. The receiver according to claim 1, wherein the filter performs low-pass filtering on the first signal to generate the output signal in a first transmission mode of the transmission modes, and generates the output signal according to the first signal in a second transmission mode of the transmission modes, wherein the output signal in the second transmission mode is an envelope signal of the first signal.

3. The receiver according to claim 1, wherein the transmission modes comprise a Universal Serial Bus (USB) mode and a Serial Advanced Technology Attachment (SATA) mode.

4. The receiver according to claim 1, wherein the termination resistor circuit comprises:

a plurality of termination resistors, coupled to ground, and receiving the input signals;

a plurality of first switches, coupled to the termination resistors, turned on in the transmission modes and turned off in the calibration mode;

a plurality of second switches, coupled to the first switches, turned on in the calibration mode and turned off in the transmission modes;

a plurality of capacitors, coupled to the first switches and the second switches; and a plurality of first resistors, coupled to the capacitors, and receiving the termination resistor circuit common-mode voltage.

5. The receiver according to claim 1, wherein the reference voltage generator comprises:

a voltage dividing circuit, generating the reference voltages and the reference voltage generator common-mode voltage;

a plurality of first switches, turned on in the calibration mode so as to transmit the reference voltage generator common-mode voltage to the comparator; and a plurality of second switches, turned on in the transmission mode so as to transmit the reference voltages to the comparator.

6. The receiver according to claim 1, wherein the filter comprises:

a first switch, turned off in the transmission modes, and turned on in the calibration mode so as to output the first signal as the output signal;

a first filter circuit, generating a second signal according to the first signal;

a second filter circuit, generating a third signal according to the first signal;

a second switch, turned on in a first transmission mode of the transmission modes so as to output the second signal as the output signal; and a third switch, turned on in a second transmission mode of the transmission modes so as to output the third signal as the output signal.

7. The receiver according to claim 6, wherein the first filter circuit comprises:

a transistor, selectively turned on according to the first signal so as to adjust a level of a node;

a current source, coupled to the node;

a capacitor, coupled between the node and ground; and an inverter, generating the second signal according to the level of the node.

8. The receiver according to claim 6, wherein the second filter circuit comprises:

an inverter, generating a fourth signal according to the first signal;

a transistor, selectively turned on according to the fourth signal so as to adjust a level of a node;

a current source, coupled to the node;

a capacitor, coupled between the node and ground; and a buffer, generating the third signal according to the level of the node.

9. The receiver according to claim 1, further comprising:

a digital-to-analog converter (DAC), sourcing a plurality of current signals from the comparator according to the offset calibration signal so as to calibrate the comparator.

10. The receiver according to claim 1, wherein the comparator has different circuit configurations in the transmission modes.

11. The receiver according to claim 1, wherein the comparator comprises:

a plurality of resistors;

a plurality of input pair circuits, coupled to the resistors, generating a plurality of second signals according to the reference voltage generator common-mode voltage and the termination resistor circuit common-mode voltage in the calibration mode, and generating the second signals according to the input signals and the reference voltages in the transmission modes;

a differential to single-ended circuit, generating the first signal according to the second signals; and a plurality of current sources, driving the input pair circuits.

12. The receiver according to claim 11, wherein resistance values of the resistors in a first transmission mode of the transmission modes are different from resistance values of the resistors in a second transmission mode of the transmission modes.

13. The receiver according to claim 11, wherein current values of the current sources in a first transmission mode of the transmission modes are different from current values of the current sources in a second transmission mode of the transmission modes.

* * * * *